(12) United States Patent
Powers et al.

(10) Patent No.: US 11,555,225 B2
(45) Date of Patent: Jan. 17, 2023

(54) METHODS OF MANUFACTURING HYPOID GEARS

(71) Applicant: Ford Global Technologies, LLC, Dearborn, MI (US)

(72) Inventors: David Powers, Farmington Hills, MI (US); Jason Richard Savage, South Lyon, MI (US); Chunliang Hsiao, Troy, MI (US); Paul John Bojanowski, Macomb Township, MI (US); Greg Gasiewski, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 893 days.

(21) Appl. No.: 16/396,298

(22) Filed: Apr. 26, 2019

(65) Prior Publication Data

US 2020/0340074 A1     Oct. 29, 2020

(51) Int. Cl.
  *C21D 9/32*          (2006.01)
  *B23F 19/10*         (2006.01)
  (Continued)

(52) U.S. Cl.
  CPC .............. *C21D 9/32* (2013.01); *B23F 17/001* (2013.01); *B23F 19/104* (2013.01); *B23F 21/16* (2013.01);
  (Continued)

(58) Field of Classification Search
  CPC .... C23C 8/20; C23C 8/22; C21D 1/10; C21D 7/06; C21D 9/32; B23F 17/001; B23F 19/104
  See application file for complete search history.

(56) References Cited

U.S. PATENT DOCUMENTS

| 3,786,719 A | 1/1974 | Kimura et al. |
| 4,222,793 A * | 9/1980 | Grindahl .................. C21D 7/06 |
| | | 148/544 |

(Continued)

FOREIGN PATENT DOCUMENTS

| CN | 102784974 | 11/2012 |
| CN | 103831599 | 6/2014 |

(Continued)

OTHER PUBLICATIONS

Stadtfeld, Hermann J. "The basics of spiral bevel gears." Gear technology 2 (2001): 31-38 (Year: 2001).*

(Continued)

*Primary Examiner* — Anthony J Zimmer
*Assistant Examiner* — Sean P. O'Keefe
(74) *Attorney, Agent, or Firm* — Burris Law, PLLC

(57) ABSTRACT

A method of manufacturing a hypoid gear includes face hobbing a gear blank and forming a green hypoid gear with gear teeth, heat treating the green hypoid gear to form a heat treated hypoid gear with heat treated gear teeth, and hard hobbing the heat treated gear teeth to form a hard finished hypoid gear. Critical non-tooth features on the heat treated hypoid gear are hard finished. Also, the critical non-tooth features on the heat treated hypoid gear can be hard finished prior to hard hobbing the heat treated gear teeth. The heat treating includes at least one of carburizing and induction hardening the green hypoid gear, a surface of the heat treated gear teeth has a hardness greater than or equal to 58 HRC, and the hard hobbing removes heat distortion from the heat treated gear teeth.

17 Claims, 6 Drawing Sheets

(51) Int. Cl.
*B23F 17/00* (2006.01)
*C21D 1/10* (2006.01)
*C23C 8/20* (2006.01)
*C21D 7/06* (2006.01)
*B23F 21/16* (2006.01)

(52) U.S. Cl.
CPC ............ *C21D 1/10* (2013.01); *C21D 7/06* (2013.01); *C23C 8/20* (2013.01)

(56) References Cited

U.S. PATENT DOCUMENTS

| | | | |
|---|---|---|---|
| 4,565,474 A | | 1/1986 | Charles |
| 4,761,867 A | * | 8/1988 | Vollmer .................. F16H 48/08 29/893.3 |
| 4,949,456 A | * | 8/1990 | Kovach .................. B23P 15/14 29/DIG. 49 |
| 5,114,287 A | * | 5/1992 | Ervay .................. B23F 19/102 409/13 |
| 5,174,699 A | | 12/1992 | Faulstich |
| 6,134,786 A | | 10/2000 | Graupner et al. |
| 6,336,777 B1 | | 1/2002 | Fisher et al. |
| 6,390,893 B1 | | 5/2002 | Stadtfeld et al. |
| 6,416,262 B1 | | 7/2002 | Ishimaru et al. |
| 7,775,749 B2 | * | 8/2010 | Ribbeck ................ B23F 21/226 409/27 |
| 2004/0219051 A1 | * | 11/2004 | Sonti ........................ B22F 5/08 419/31 |
| 2005/0266774 A1 | | 12/2005 | Baldeck |
| 2018/0354047 A1 | | 12/2018 | Sato et al. |

FOREIGN PATENT DOCUMENTS

| | | |
|---|---|---|
| CN | 106271473 | 1/2017 |
| CN | 107116346 | 9/2017 |
| DE | 3826029 | 7/1990 |
| DE | 102011118702 | 5/2012 |

OTHER PUBLICATIONS

Klingelnberg, Jan. "Manufacturing Process." Bevel Gear. Springer Vieweg, Berlin, Heidelberg, 2016. 233-290 (Year: 2016).*

Broadwind Energy, Inc., Spiral Bevel Gears up to 100" Diameter, media/blog pp. 1-2, Feb. 10, 2019.

Firstgear Engineering & Technology, Skiving, informational page, Feb. 10, 2019.

Miaiuri, T.J., Spiral Bevel and Hypoid Gear Cutting Technology Update, Geartechnology, pp. 28-39, Jul. 2007.

Gleason, P60—Compact Solution for Gears, Shafts and Worms, product pages.

Torii, T., Technical Update on NC Hobbing Machine, Finish Hobbing of Hardened Gears with Carbide Hobs, Technical Information, pp. 1-14, Apr. 2010.

Santos, et al., Finishing Process Analysis Between Honing and Hard Hobbing in Pinion Gears Applied to a Steering System, SciVerse Science Direct, Energy Procedia, vol. 14, pp. 2-8, Elsevier, 2012.

* cited by examiner

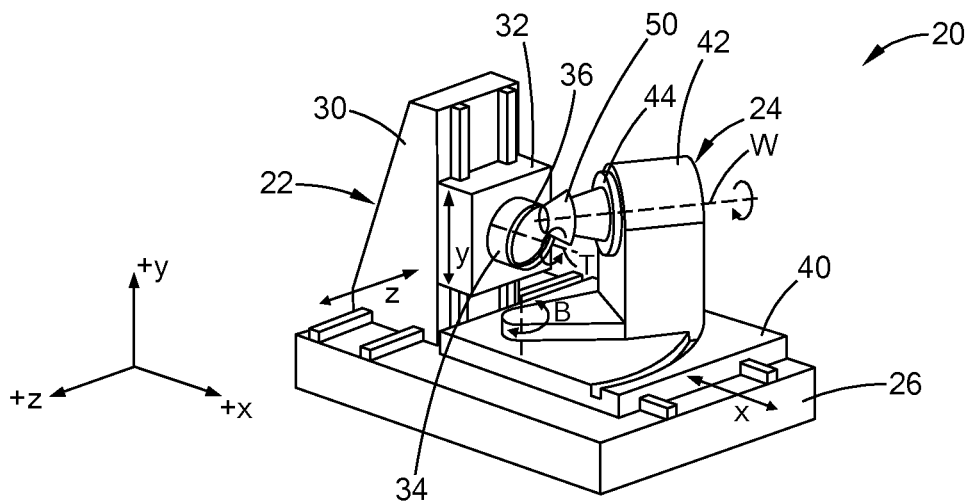
FIG. 1
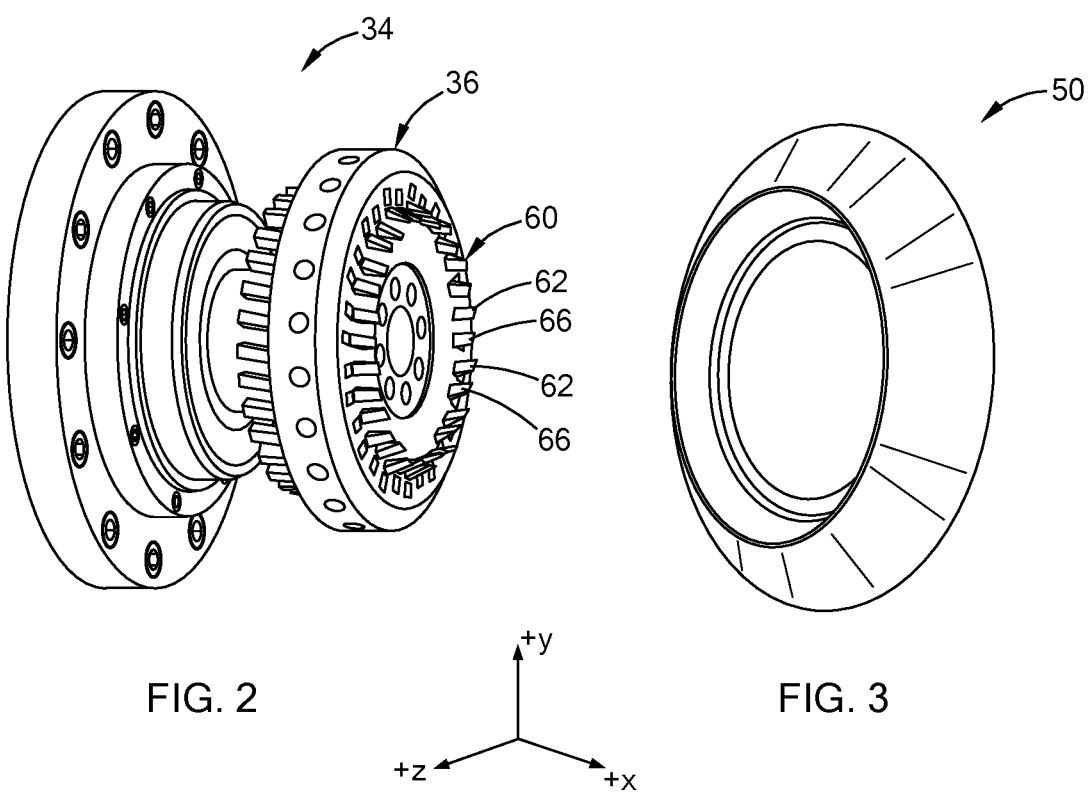
FIG. 2
FIG. 3

METHODS OF MANUFACTURING HYPOID GEARS

FIELD

The present disclosure relates to manufacturing gears and particularly manufacturing hypoid gears.

BACKGROUND

The statements in this section merely provide background information related to the present disclosure and may not constitute prior art.

Hypoid gears are used in vehicle power transmission devices and is a type of spiral bevel gear with an axis that does not intersect with the axis of the corresponding meshing gear. For example, a hypoid ring gear and a matching hypoid pinion gear off-sets the hypoid pinion gear centerline from the hypoid ring gear. Such an off-set between the two gears allows the hypoid pinion gear to be larger (than if not off-set) thereby providing more contact area between the two gears.

The manufacture of a hypoid gear includes among other steps, machining a gear blank (sometimes referred to as "gear stock") to form a hypoid gear preform (also known as a green hypoid gear), heat treating the green hypoid gear to increase wear resistance of the gear teeth, and grinding or lapping (also known as hard finishing) the heat treated green hypoid gear to produce a finished hypoid gear with a final shape, wear resistance, surface finish, and the like. However, grinding and lapping processes are both expensive and have an environmental impact. Also, the lapping process produces a matched set of hypoid gears (e.g., a hypoid ring gear and a matching hypoid pinion gear) that must be installed and replaced as a matched set, thereby increasing inventory costs for storing matched sets of hypoid gears and repair costs for having to replace a damaged hypoid gear with a matched set.

The present disclosure addresses the issues of hard finishing of hardened hypoid gear preforms among other issues related to manufacturing hypoid gears.

SUMMARY

This section provides a general summary of the disclosure and is not a comprehensive disclosure of its full scope or all of its features.

In one form of the present disclosure, a method of manufacturing a hypoid gear includes face hobbing a gear blank and forming a green hypoid gear with gear teeth, heat treating the green hypoid gear to form a heat treated (black) hypoid gear with heat treated (black) gear teeth, and hard hobbing the black gear teeth to form a hard finished hypoid gear. In some aspects of the present disclosure, the heat treating includes carburizing and/or induction hardening the green hypoid gear. In such aspects, a surface of the black gear teeth has a hardness greater than or equal to 58 HRC. Also, the hard hobbing removes heat distortion from the black gear teeth.

In some aspects of the present disclosure critical non-tooth features on the black hypoid gear are hard finished. In such aspects, the critical non-tooth features on the black hypoid gear can be hard finished prior to hard hobbing the black gear teeth. In other aspects of the present disclosure, the black hypoid gear is shot peened prior to or after hard hobbing the black gear teeth.

In some aspects of the present disclosure, critical non-tooth features on the black hypoid gear are hard finished and the black gear teeth and root portions between the black gear teeth are shot peened prior to or after hard hobbing the black teeth.

In some aspects of the present disclosure, the green hypoid gear includes a green hypoid ring gear and a green hypoid pinion gear. In such aspects, hard hobbing the black gear teeth includes hard hobbing black gear teeth of the green hypoid ring gear and hard hobbing black gear teeth of the green hypoid pinion gear such that a hard finished hypoid ring gear and a hard finished hypoid pinion gear are provided. In some aspects, the hypoid ring gear and the hypoid pinion gear are formed independently.

In some aspects of the present disclosure face hobbing the green hypoid gear removes material from a root region of the green hypoid pinion gear and hard hobbing the black hypoid gear does not remove material from the root region of the black hypoid gear. In other aspects, hard hobbing the black gear teeth of the black hypoid gear removes material along an entire face width of the black gear teeth. In some aspects, hard hobbing the black gear teeth of the black hypoid gear removes material uniformly along an entire face width of the black gear teeth. Also, in some aspects the cutting tool can include a plurality of outside cutting blades and a plurality of inside cutting blades. In such aspects an outside cutting blade cuts a concave side of a black gear tooth and a inside side cutting blade cuts a convex side of the black gear tooth. In such aspects, the outside cutting blade can complete the cut of the concave side of the black gear tooth before the inside side cutting blade begins the cut of the convex side of the black gear tooth. In other aspects, hard hobbing the black teeth can include rotation of a cutting tool with a plurality of blades comprising a twin-blade design such that each blade simultaneously takes a uniform cut of a convex side and a concave side of adjacent black gear teeth.

In another form of the present disclosure, a method of manufacturing a hypoid gear includes face hobbing a gear blank and forming a green hypoid gear with green gear teeth and heat treating the green hypoid gear to form a black hypoid gear with black gear teeth. Critical non-tooth features on the black hypoid gear are hard finished and the black hypoid gear is shot peened before or after the black gear teeth is hard hobbed to form a hard finished hypoid gear. In some aspects of the present disclosure, hard hobbing the black gear teeth removes material uniformly along an entire face width of the black gear teeth. Also, hard hobbing the black gear teeth can include rotation of a cutting tool with a plurality of inside side cutting blades and a plurality of outside side cutting blades such that an inside cutting blade completes a uniform cut of a convex side of a black gear tooth before an outside cutting blade begins a uniform cut of a concave side of another black gear tooth. In some aspects, hard hobbing the black teeth can include rotation of a cutting tool with a plurality of blades comprising a twin-blade design such that each blade simultaneously takes a uniform cut of a convex side and a concave side of adjacent black gear teeth.

In still another form of the present disclosure a method of manufacturing a hypoid gear includes face hobbing a gear blank and forming a green hypoid gear with green gear teeth, heat treating the green hypoid gear to form a black hypoid gear with black gear teeth, and hard finishing critical non-tooth features on the black hypoid gear. The black hypoid gear is shot peened and hard hobbed to form a hard finished hypoid gear. Also, hard hobbing the black gear teeth includes rotation of a cutting tool with a plurality of inside side cutting blades and a plurality of outside side cutting blades such that a inside side cutting blade completes a uniform cut of a convex side of a black gear tooth before a outside side cutting blade begins a uniform cut of a concave side of an adjacent black gear tooth. In some aspects, hard hobbing the black teeth can include rotation of a cutting tool with a plurality of blades comprising a twin-blade design such that each blade simultaneously takes a uniform cut of a convex side and a concave side of adjacent black gear teeth.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a perspective view of a gear cutter system;

FIG. 2 is a perspective view of cutting tool;

FIG. 3 is perspective view of hypoid gear blank;

Figure 4:
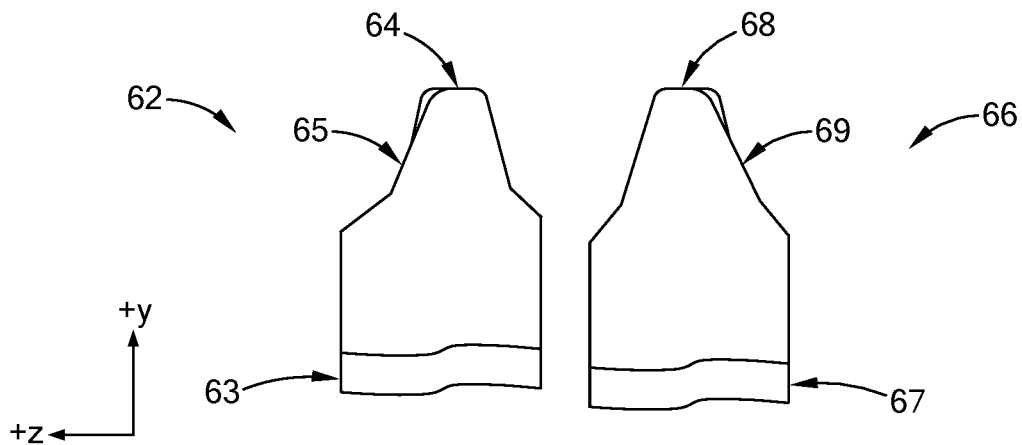
FIG. 4 is a side view of an outside cutting blade and inside cutting blade for a cutting tool according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Referring now to FIG. 1, a gear cutting system 20 includes a tool support 22, and a work support 24 supported by a base 26. The tool support 22 includes a carriage 30, a tool head 32, a tool spindle 34, and a cutting tool 36, The carriage 30 is moveable relative to the base 26 generally in the spatial direction z depicted in the figures. The tool head 32 is moveable relative to the carriage 30 generally in the spatial direction y. The tool spindle 34 may be moveable relative to the tool head 32 generally in the spatial direction x while rotating the tool head 36. Accordingly, the tool head 36 may be rotated in the rotational direction T and moved in any of the spatial directions x, y, z simultaneously. Further, these movements are controlled by a device such as a computer numeric control (CNC) machine that may be capable of very fine adjustments on the order of millionths of an inch. The work support 24 includes a table 40, a work head 42, and a work spindle 44. The work spindle 44 is illustrated with a gear stock 50 attached thereto. The work table 40 is moveable relative to the base 26 generally in the spatial direction x. The work head 42 is moveable relative to the table 40 generally in the rotational direction B The work spindle 44 is moveable relative to the work head 42 generally in the rotational direction VV.

Referring now to FIGS. 2 and 3, an enlarged view of the tool spindle 34 and the cutting tool 36 is depicted in FIG. 2 and an enlarged view of the gear stock 50 (also referred to herein as a "gear blank"). Particularly, the cutting tool 36 is rigidly attached to the tool spindle 34 and includes a plurality of cutting blades 60. Also, the plurality of blades 60 include a plurality of outside blades 62 and a plurality of inside blades 66 alternately positioned between each other as shown in FIG. 2. An enlarged side view of an outside blade 62 and an inside blade 66 is shown in FIG. 4. Generally, the outside blade 62 includes a root end 63, a tip end 64 and an outside cutting face 65. Similarly, the inside blade 66 includes a root end 67, a tip end 68 and an inside cutting face 69.

Figure 5:
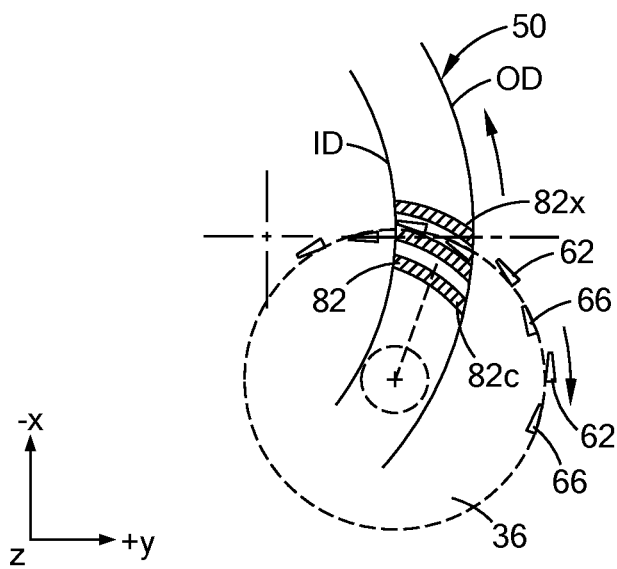
FIG. 5 is planar view of the gear cutter tool in FIG. 2 cutting the hypoid gear blank in FIG. 3 to from a green hypoid gear.
Figure 6:
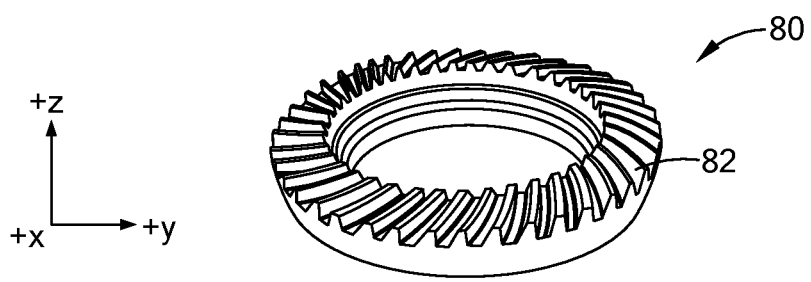
FIG. 6 is perspective view of hypoid gear preformed.

Referring now to FIG. 5, forming of a green hypoid ring gear 80 (FIG. 6) by cutting of the gear preform 50 with the cutting tool 36 is depicted. Particularly, with the cutting tool 36 rotating about the z-axis and the gear blank 50 rotating in the W direction, the cutting tool 36 and the gear blank 50 are moved into contact with each other at a desired angle(s) such that the plurality of outside blades 62 cut a concave side 82c of a plurality of hypoid gear teeth 82 and the plurality of inside blades 66 cut a convex side 82x of the plurality of hypoid gear teeth 82 such that the green hypoid ring gear 80 with the plurality of gear teeth 82 is formed as shown in FIG. 6. That is, the system 20 forms the green hypoid ring gear 80 with the plurality of hypoid gear teeth 82 as the cutting tool 36 is rotated relative to the gear blank 50 at a desired angle and feed rate and the cutting tool 36 cuts across the width (i.e., from the inner diameter (ID) to the outer diameter (OD)) of the gear preform 50. It should be understood that such a method or process is known as "face hobbing."

Figure 7:
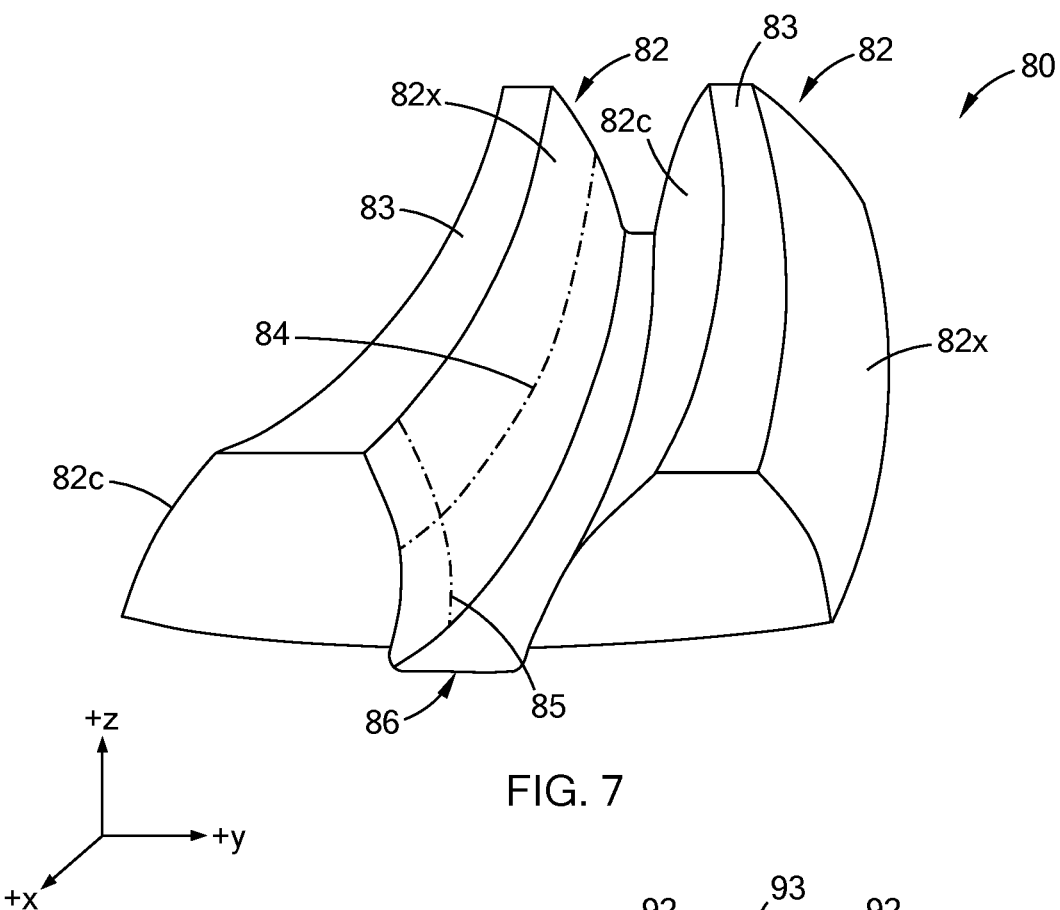
FIG. 7 depicts an enlarged perspective view of teeth from the hypoid gear preform in FIG. 6.

Referring now to FIG. 7, an enlarged view of two gear teeth 82 from the green hypoid ring gear 80 is shown. Particularly, the gear teeth 82 comprise, among other features, the concave side 82c, the convex side 82x, a tip 83, a lengthwise crown 84, a profile crown 85, a pressure angle (not labeled) and a spiral angle (not labeled). Also, between adjacent gear teeth 82 is a root 86.

Figure 8:
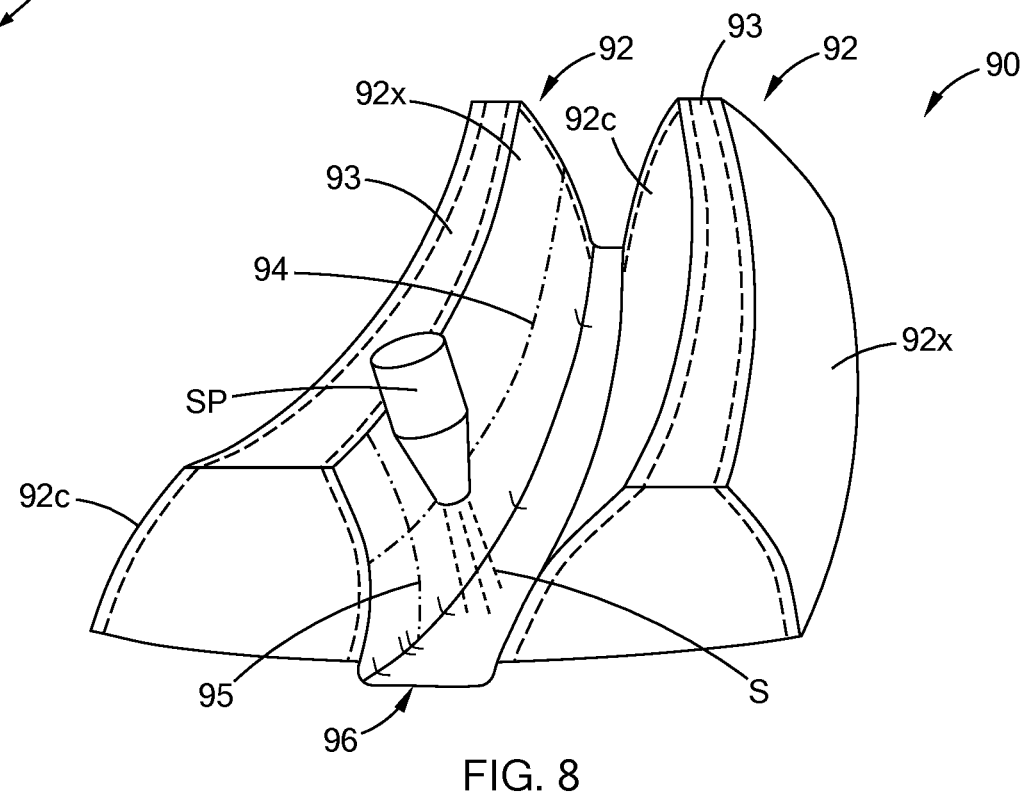
FIG. 8 depicts the teeth of the hypoid gear in FIG. 7 after heat treatment of the hypoid gear preform.

After the green hypoid ring gear 80 is formed, it is heat treated to produce a heat treated hypoid ring gear 90 depicted in FIG. 8 (also referred to herein as a "black hypoid ring gear"). The black hypoid ring gear 90 has heat treated gear teeth 92 (also referred to herein as a "black hypoid gear teeth") with a surface that is resistant to wear while maintaining toughness and strength to gear below the surface (sometimes referred to as the "core" of a gear). Non-limiting examples of heat treating the green hypoid ring gear 80 (also known as case hardening) include carburizing, induction hardening, and the like. In some aspects of the present disclosure, a surface region of the black hypoid ring gear, e.g., from the surface to a depth of about 100 micrometers, has a hardness greater than or equal to 58 Rockwell C (≥58 HRC). The black gear teeth 92 comprise, among other features, a concave side 92c, a convex side 92x, a tip 93, a lengthwise crown 94, a profile crown 95, a pressure angle (not shown) and a spiral angle (not shown). Also, between adjacent gear teeth 92 is a root 96. However, heat treating the green hypoid ring gear 80 results in distortion of the gear 90 that must be removed. For example, solid lines in FIG. 8 illustrate the shape of the gear teeth 92 of the black hypoid ring gear 90 (i.e., after heat treating) and dotted lines illustrate a desired final shape of the gear teeth 92 after hard hobbing ready for installation in a power transmission device.

Still referring to FIG. 8. in some aspects of the present disclosure, at least a portion of the black hypoid ring gear 90 is shot peened 'SP' with shot 'S' to induce residual compressive stress and thereby enhance fatigue resistance and stress corrosion cracking of the hypoid gear. Also, in some aspects of the present disclosure, critical non-tooth features of the black hypoid ring gear 90 and/or the shot peened black hypoid ring gear 90 heat (e.g., an inner diameter, a reference surface, etc.) is hard finished prior to hard hobbing of the gear teeth 92 described below.

Figure 9:
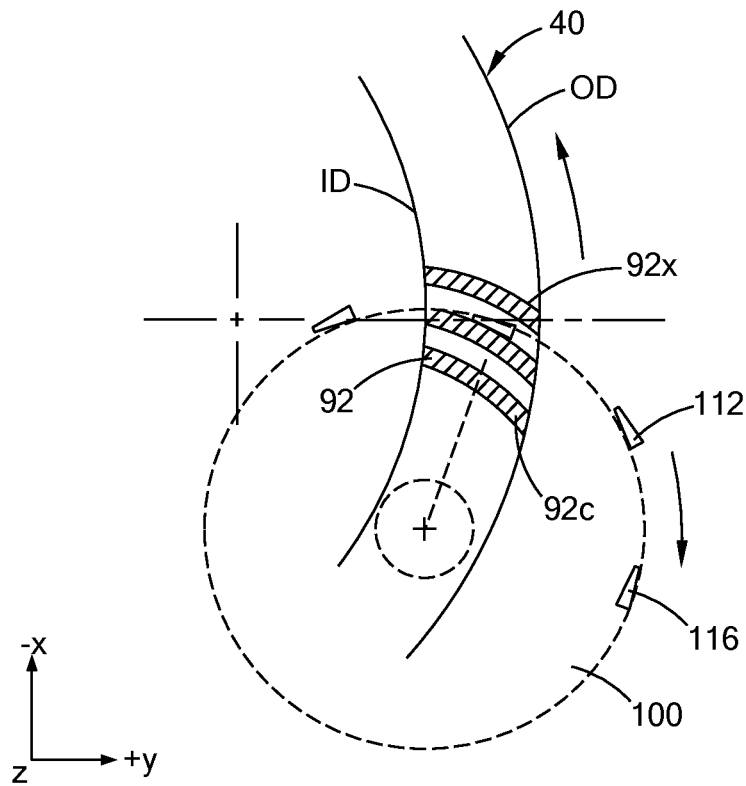
FIG. 9 depicts the cutting tool in FIG. 2 the hypoid gear in FIG. 8.
Figure 10:
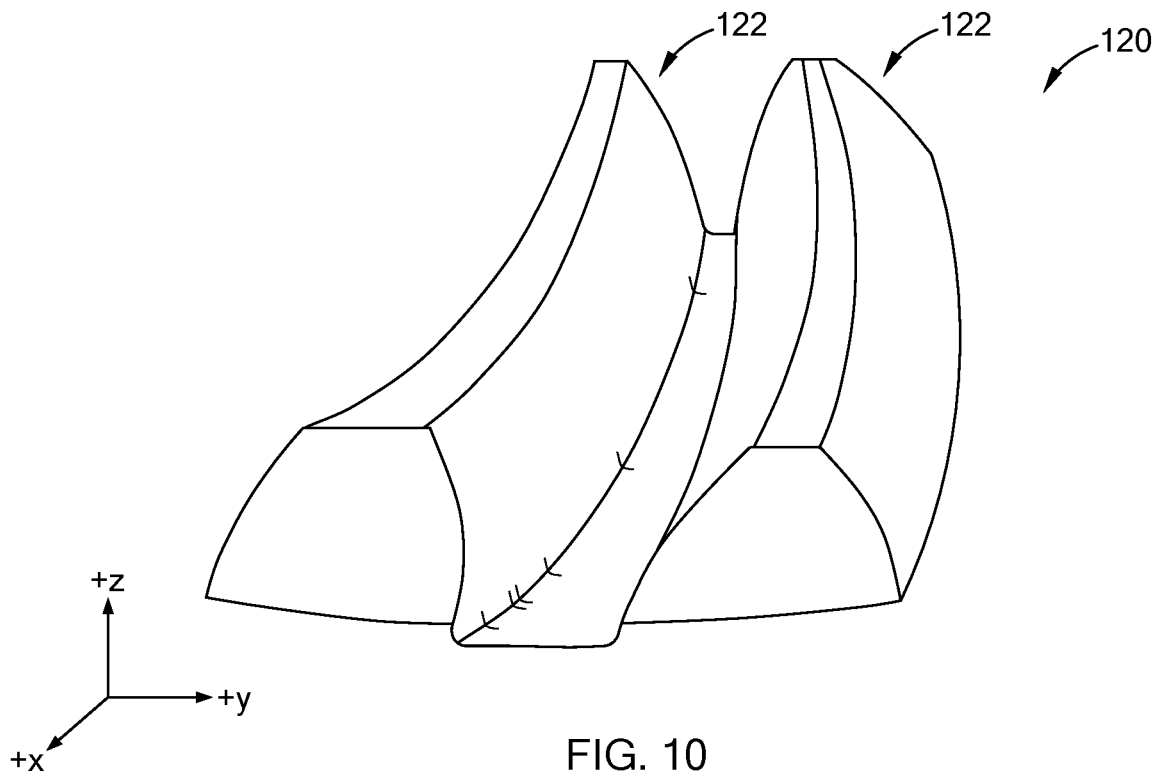
FIG. 10 depicts the teeth of the hypoid gear in FIG. 8 after according to the teachings of the present disclosure.

Referring now to FIG. 9, a cutting tool 100 comprising a plurality of cutting blades 110 according to the present disclosure is shown. In some aspects of the present disclosure, the cutting tool 100 is the same as cutting tool 36 shown in FIG. 2. The cutting tool 100 includes a plurality of outside blades 112 and a plurality of inside blades 116 that cut the black hypoid ring gear 90 to form a hard finished hypoid ring gear 120 (FIG. 10). Particularly, the plurality of cutting blades 110 rotate about the z-axis and the black hypoid ring gear 90 rotates in the W direction, and the cutting tool 100 and the black hypoid ring gear 90 are moved into contact with each other at a desired angle(s) and feed rate such that the plurality of outside blades 112 cut the concave side 92c of the plurality of hypoid gear teeth 92 and the plurality of inside blades 116 cut the convex side 92x of the plurality of hypoid gear teeth 92 such that the hard finished hypoid ring gear 120 with a plurality of hard finished gear teeth 122 is formed as shown in FIG. 10. That is, the plurality of hard finished hypoid gear teeth 122 on the black hypoid ring gear 90 are formed as the cutting tool 100 is rotated relative to the gear 90 at a desired angle(s) and feed rate. In some aspects of the present disclosure, the plurality of cutting blades 110 cut along an entire face width (i.e., from the inner diameter (ID) to the outer diameter (OD)) of the black gear teeth 92. Such a method or process is referred to herein as "hard hobbing" of the black hypoid ring gear 90, the hard finished teeth gear teeth 122 are referred to herein as "hard hobbed" gear teeth 122, and hard hobbing of the black hypoid ring gear 90 recovers heat treat distortion resulting from heat treating the green hypoid ring gear 80.

In some aspects of the present disclosure, the cutting blades 110 of the cutting tool 100 are spaced apart from and positioned relative to each other such that the cutting blades are not cutting a concave side 82c and a convex side 82x at the same time. That is, a given cutting blade 112, 116 completes a cut of a concave side 82c, convex side 82x, respectively, before the next cutting blade 116, 112 starts a cut of a subsequent convex side 82x, concave side 82c, respectively. In such aspects, movement or vibration of the black hypoid ring gear 90 during hard hobbing of the gear teeth 82 is reduced thereby providing enhanced accuracy and quality during hard hobbing.

In other aspects of the present disclosure, the cutting blades 110 of the cutting tool 100 comprise a twin-blade design (not shown) such that a given cutting blade 110 simultaneously cuts a concave side 82c and a convex side 82x of adjacent black hypoid gear teeth 92. That is, each of the cutting blades 110 have an inside cutting face (not shown) and an outside cutting face (not shown) such that each cutting blade 110 simultaneously cuts the concave side 82c and the convex side 82x of adjacent black hypoid gear teeth 92. In still other aspects of the present disclosure, the cutting blades 110 are coated before hard hobbing the black hypoid gear teeth 92.

In some aspects of the present disclosure, the hard hobbing produces hypoid gears that meet the ANSI/AGMA ISO 17485-A08 standard which defines a classification system for geometrical accuracy specifications of unassembled hypoid gears.

Figure 11:
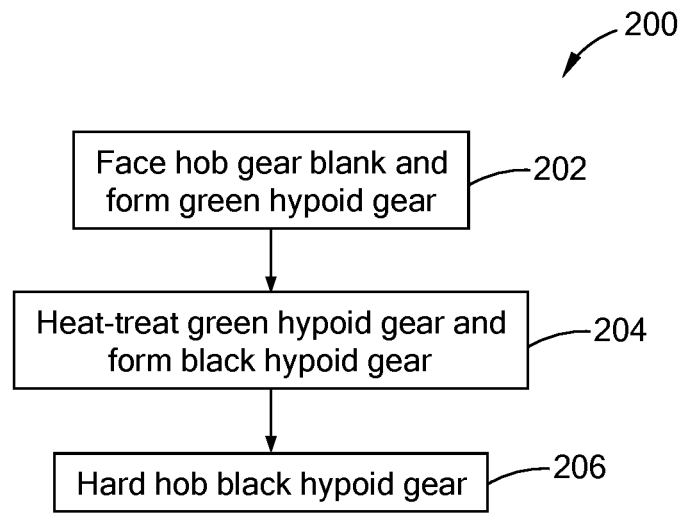
FIG. 11 depicts a flow chart for a method of manufacturing a hypoid gear according to the teachings of the present disclosure.

Referring now to FIG. 11, a method 200 for forming a hard finished hypoid gear includes face hobbing a gear blank to form a green hypoid gear at step 202, heat treating the green hypoid gear at step 204 to form a black hypoid gear and hard hobbing the black hypoid gear at step 206.

Figure 12:
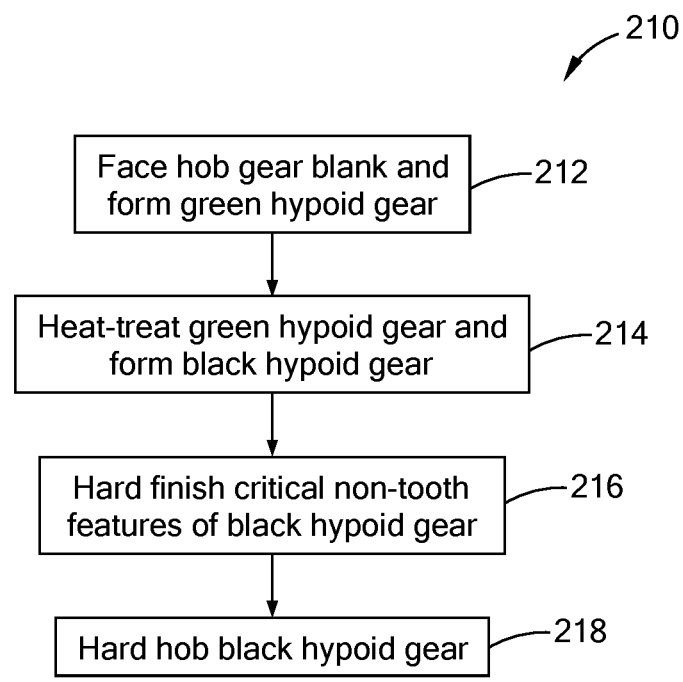
FIG. 12 depicts a flow chart for another method of manufacturing a hypoid gear according to the teachings of the present disclosure.

Referring now to FIG. 12, another method 210 for forming a hard finished hypoid gear includes face hobbing a gear blank to form a green hypoid gear at step 212 and heat treating the green hypoid gear at step 214 to form a black hypoid gear. Non-tooth critical features of the black hypoid gear are hard finished at step 216 and then the black hypoid gear with hard finished non-tooth critical features is hard hobbed at step 218.

Figure 13:
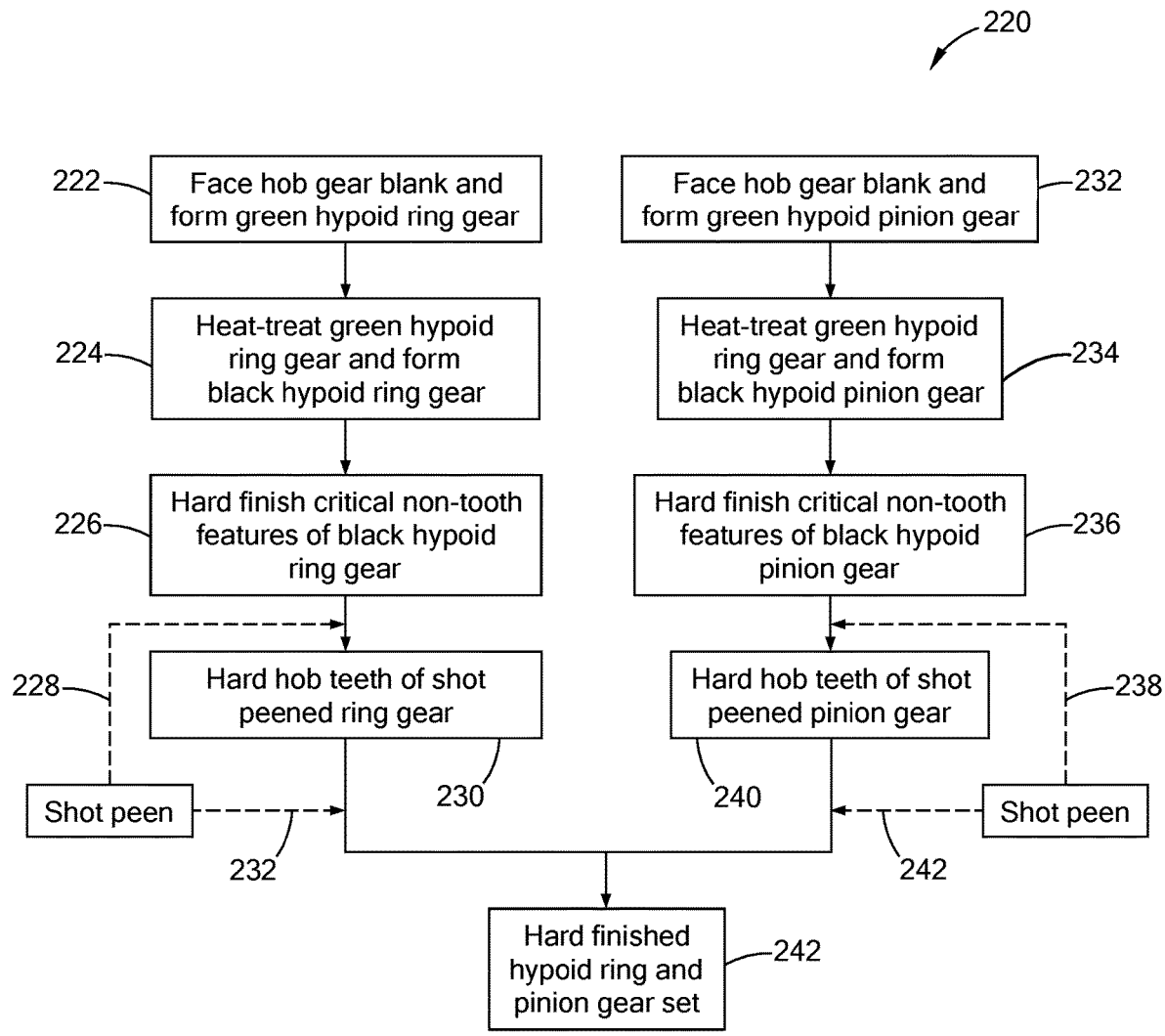
FIG. 13 depicts a flow chart for another method of manufacturing a hypoid gear according to the teachings of the present disclosure.

Referring now to FIG. 13, another method 220 for forming a hard finished hypoid gear set, e.g., a hard finished hypoid ring gear and a hard finished hypoid pinion gear, includes face hobbing a ring gear blank to form a green hypoid ring gear at step 222 and heat treating the green hypoid ring gear at step 224 to form a black hypoid ring gear. Non-tooth critical features of the black hypoid ring gear are hard finished at step 226. In some aspects of the present disclosure, the black hypoid ring gear with hard finished non-tooth critical features is shot peened at step 228 and the shot peened black hypoid ring gear is hard hobbed at step 230 to form a hard finished hypoid ring gear. In other aspects of the present disclosure, the black hypoid ring gear with hard finished non-tooth critical features is hard hobbed at step 230 and then shot peened at step 232 to form a hard finished hypoid ring gear, i.e., the black hypoid ring gear is shot peened after hard hobbing rather than before hard knobbing.

The method 220 also includes face hobbing a pinion gear blank to form a green hypoid pinion gear at step 232 and heat treating the green hypoid pinion gear at step 234 to from a black hypoid pinion gear. Non-tooth critical features of the black hypoid pinion gear are hard finished at step 236. In some aspects of the present disclosure, the black hypoid pinion gear with hard finished non-tooth critical features is shot peened at step 238 and the shot peened black hypoid pinion gear is hard hobbed at step 240 to form a hard finished hypoid pinion gear. In other aspects of the present disclosure, the black hypoid pinion gear with hard finished non-tooth critical features is hard hobbed at step 240 and then shot peened at step 242 to form a hard finished hypoid pinion gear, i.e., the black hypoid pinion gear is shot peened after hard hobbing rather than before hard knobbing.

The hard finished hypoid ring gear and the hard finished hypoid pinion gear provide the hard finished hypoid gear set at step 242. However, unlike lapping of hypoid ring gears and hypoid pinion gears to form a matched set, hard hobbing black hypoid ring gears and black hypoid pinion gears provides hard finished hypoid ring gears and hard finished pinion gears that do not have to be matched prior to installation in a gear casing. That is, the hypoid ring gears and hypoid pinion gears are formed independently from each other. Accordingly, replacement cost and cost of inventory are reduced using the hard hobbing method according to the teachings of the present disclosure. Also, and unlike hard finishing hypoid gears by grinding which requires grinding of the gear teeth individually, hard hobbing hypoid gears takes sequential cuts from the gear teeth thereby reducing time and cost for the hard finishing process.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spacially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method of manufacturing a hard finished hypoid gear comprising:
    face hobbing a gear blank and forming a green hypoid gear with green gear teeth;
    heat treating the green hypoid gear to form a black hypoid gear with black gear teeth; and
    hard hobbing the black gear teeth to form the hard finished hypoid gear,
wherein heat treating a root region of the green hypoid gear forms a root region of the black hypoid gear,
wherein face hobbing the green hypoid gear removes material from the root region of the green hypoid gear and hard hobbing the black hypoid gear does not remove material from the root region of the black hypoid gear.

2. The method according to claim 1, wherein the heat treating comprises at least one of carburizing and induction hardening the green hypoid gear.

3. The method according to claim 2, wherein a surface of the black gear teeth comprises a hardness greater than or equal to 58 HRc.

4. The method according to claim 1 further comprising hard finishing non-tooth features on the black hypoid gear.

5. The method according to claim 1 further comprising hard finishing non-tooth features on the black hypoid gear prior to hard hobbing the black gear teeth.

6. The method according to claim 1 further comprising shot peening the black hypoid gear prior to hard hobbing the black gear teeth.

7. The method according to claim 1 further comprising hard finishing non-tooth features on the black hypoid gear and shot peening root portions between the black gear teeth prior to hard hobbing the black gear teeth.

8. The method according to claim 1, wherein the hard hobbing removes heat treat distortion from the black gear teeth.

9. The method according to claim 1, wherein the green hypoid gear comprises a green hypoid ring gear and a green hypoid pinion gear.

10. The method according to claim 9, wherein the black hypoid gear formed by heat treating the green hypoid gear comprises a black hypoid ring gear and a black hypoid pinion gear, wherein hard hobbing the black gear teeth comprises hard hobbing black gear teeth of the black hypoid ring gear and hard hobbing black gear teeth of the black hypoid pinion gear to form a hard finished hypoid ring gear and a hard finished hypoid pinion gear.

11. The method according to claim 1, wherein hard hobbing the black gear teeth of the black hypoid gear removes material along an entire face width of the black gear teeth.

12. The method according to claim 11, wherein hard hobbing the black gear teeth further comprising removing the material with a cutting tool, wherein the cutting tool comprises a plurality of inside cutting blades and a plurality of outside cutting blades and an inside cutting blade completes a cut of a convex side of a black gear tooth before an outside cutting blade begins a cut a concave side of the black gear tooth.

13. A method of manufacturing a hard finished hypoid gear comprising:
    face hobbing a gear blank and forming a green hypoid gear with green gear teeth;
    heat treating the green hypoid gear to form a black hypoid gear with black gear teeth;
    hard finishing non-tooth features on the black hypoid gear;
    shot peening the black hypoid gear; and
    hard hobbing the black gear teeth to form the hard finished hypoid gear,
wherein heat treating a root region of the green hypoid gear forms a root region of the black hypoid gear,
wherein face hobbing the green hypoid gear removes material from the root region of the green hypoid gear and hard hobbing the black hypoid gear does not remove material from the root region of the black hypoid gear.

14. The method according to claim 13, wherein hard hobbing the black gear teeth of the black hypoid gear removes material along an entire face width of the black gear teeth.

15. The method according to claim 13, wherein hard hobbing the black gear teeth comprises rotation of a cutting tool with a plurality inside cutting blades and a plurality of outside cutting blades such that an inside cutting blade completes a cut of a convex side of a black gear tooth before an outside side cutting blade begins a cut of a concave side of the black gear tooth.

16. The method according to claim 13, wherein hard hobbing the black gear teeth comprises rotation of a cutting tool with a plurality of cutting blades with a twin-blade design such that each cutting blade simultaneously cuts a convex side and a concave side of adjacent black gear teeth.

17. A method of manufacturing a hypoid gear comprising:
    face hobbing a gear blank and forming a green hypoid gear with green gear teeth;
    heat treating the green hypoid gear to form a black hypoid gear with black gear teeth;
    hard finishing non-tooth features on the black hypoid gear;
    shot peening the black hypoid gear; and
    hard hobbing the black gear teeth to form the hypoid gear,
wherein heat treating a root region of the green hypoid gear forms a root region of the black hypoid gear,
wherein hard hobbing the black gear teeth comprises rotation of a cutting tool with a plurality of outside cutting blades such that an inside cutting blade completes a cut of a convex side of a black gear tooth before an outside side cutting blade begins a cut of a concave side of the black gear tooth,
wherein face hobbing the green hypoid gear removes material from the root region of the green hypoid gear and hard hobbing the black hypoid gear does not remove material from the root region of the black hypoid gear.

* * * * *